United States Patent [19]
Chabert et al.

[11] 3,860,568

[45] Jan. 14, 1975

[54] NOVEL POLYMERIZATION INITIATOR AND PROCESS FOR POLYMERIZATION USING THE SAME

[75] Inventors: Henri Chabert, Chapurlat; Robert Aime, Lyon; Claude Gigiou, Vernaison; Michel Ruaud, Villeneuve Par Ternay, all of France

[73] Assignee: Rhone-Poulenc S.A., Paris, France

[22] Filed: June 19, 1970

[21] Appl. No.: 63,999

Related U.S. Application Data

[63] Continuation of Ser. No. 637,356, May 10, 1967, abandoned.

[30] Foreign Application Priority Data

May 13, 1966 France .............................. 66.61596

[52] U.S. Cl. ............ 260/92.8 R, 252/428, 252/431, 260/63 UY, 260/67 UA, 260/79.3 M, 260/79.7, 260/80 C, 260/87.1, 260/87.3, 260/87.5 R, 260/87.5 C, 260/87.5 E, 260/87.7, 260/88.3 R, 260/88.3 L, 260/88.7 C, 260/89.1, 260/89.5 A, 260/91.7, 260/93.5 R, 260/93.7, 260/94.9 CC, 260/94.9 CD, 260/94.9 E, 260/873

[51] Int. Cl. ......... C08f 3/04, C08f 3/30, C08f 15/02

[58] Field of Search .... 260/85.5 R, 85.5 M, 94.9 C, 260/88.7, 92.8, 89.1, 87.5, 88.1, 85.7

[56] References Cited

UNITED STATES PATENTS 2,610,965  9/1952  Vandenberg....................... 260/88.7

Primary Examiner—Harry Wong, Jr.
Attorney, Agent, or Firm—Cushman, Darby & Cushman

[57] ABSTRACT

A process for the polymerization of an olefinic monomer by contacting the monomer with a polymerization initiator having an oxidizing agent, a chelating compound of the metal, in which the metal is still capable of accepting one or more electron pairs from an electron donor and an electron donor in an amount at least equal to that required to complex completely the metal of the chelate compound. With the polymerization initiator, polymerization of the olefinic monomer can be accomplished at low temperatures employing oxidizing agents which are stable at the lower temperatures. Also, the solubility of the initiators allows polymerization by suspension process.

5 Claims, No Drawings

NOVEL POLYMERIZATION INITIATOR AND PROCESS FOR POLYMERIZATION USING THE SAME

This is a continuation, of application Ser. No. 637,356, filed May 10, 1967, and now abandoned.

This invention relates to the polymerisation of olefinic monomers, and to polymerisation initiators for use in such polymerisation.

Many polymerisation initiating systems of the free radical type, known as redox systems, which consist of a combination of an oxidising compound and a reducing compound, have been proposed. The oxidising compound of these systems is generally either a compound containing a mineral ion, such as the persulphate or chlorate ion, hydrogen peroxide, or an organic peroxide. The reducing compound may be a compound containing a reducing anion such as the bisulphite anion, or a metal compound in which the metal is in a lower state of oxidation, e.g., $Fe^{++}$, or an organic reducing compound such as benzoin, ascorbic acid, dihydroxyacetone, an amine, preferably a tertiary amine having the most pronounced reducing properties, or a sugar. Such systems are described in HoubenWeyl - Methoden der Organischen Chemie Makromolekulare Stoffe 14/1, pp. 263 to 297. Ternary systems consisting of redox systems of this general kind and small quantities of compounds providing metallic ions, which act as activators, have also been proposed. For these systems, the redox systems have generally consisted of oxidising agents such as organic persulphates or peroxides, and reducing agents such as benzoin, dihydroxyacetone, a bisulphite acetaldehyde addition compound, acetoin, benzenesulphinic acid, or triethanolamine, employed in approximately equal molecular quantities. The activators have been, more particularly, salts of chelates of metals such as iron, lead, nickel, cobalt, manganese or zinc, more particular naphthenates, stearates, oleates, cyclohexanecarboxylates and acetylacetonates (cf. W. Kern, Makromol. Chemie 1, 249 to 268 (1947)). These ternary systems, which have been employed for bulk polymerisations, have a high mole ratio of reducing agent to metallic compound, which may be as great as 40:1 to 120:1.

The present invention provides a new polymerisation initiator comprising, in combination, (1) an oxidizing agent, (2) a chelate compound of a metal of Group IB, IIB, IVB, VB, VIB, VIIB, IIIA, IVA, VA, or VIII of the Periodic Table with an at least bidentate ligand, in which compound the metal is still capable of accepting one or more electron pairs from an electron donor, and (3) and electron donor in amount at most equal to that required to complex completely the metal of the chelate compound. Components (2) and (3) may be present in the initiator in the form of a preformed complex.

The three components of the new intitiators are, in more detail, as follows:

1. Oxidising agents

Suitable oxidising agents for use in the new initiators include: inorganic oxidising agents such as hydrogen peroxide, persulphates, permanganates, chlorates, perchlorates, bichromates, bromates and ceric ($Ce^{++++}$) salts; and organic oxidising agents such as oxaziranes (e.g., 2-butyl-3-isopropyl-oxazirane), and organic peroxides and hydroperoxides, including, more particularly, the acyl peroxides, for example, acetyl, benzoyl, lauroyl, terephthaloyl, and acetyl-lauroyl peroxides, the alkyl, cycloalkyl, and aryl peroxides, for example, t-butyl, lauryl, t-butyllauryl, cyclohexyl and cumyl peroxides, and the hydroperoxides, for example cyclohexyl and cumyl hydroperoxide.

2. Chelate compounds

The chelate compounds used in the new initiators have a central metallic atom which still possesses the ability to accept at leat one electron doublet from an electron donor atom, i.e., the degree of co-ordination of the central metallic atom is lower than the maximum degree of co-ordination of this atom.

The co-ordination number of a metallic acceptor atom represents the number of atoms directly attahced to this central atom in a complex. With some metals in a high degree of oxidation, this co-ordination number is fixed and is characteristic of the metal, without the co-ordination number and the degree of oxidation being the same; while with other metals the co-ordination number may have various different values for a given degree of oxidation. In some cases, a correlation may exist between the co-ordination number and the degree of oxidation, while in other cases the co-ordination number is the same regardless of the degree of oxdiation. The co-ordination number sometimes depends upon the nature of the donor atom.

The chelates employed in the present invention may be represented by the general formula:

$$X_n[MQ_s(D_pA)]_m$$

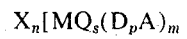

in which M represents a metal atom of group IB, IIB, IVB, VB, VIB, VIIB, IIIA, IVA, VA or VIII of the Periodic Table (see, e.g., Handbook of Chemistry and Physics, 45th Edition, p. B.2), preferably titanium, iron, vanadium, aluminium, tin, manganese, chromium, cobalt, copper, zinc, or bismuth; D represents an electron-doublet donor group such as one of these defined by Dwyer and Mellor in "Chelating Agents and Metal Chelates," 1964, pp. 17 and 18; A is an organic residue carrying the groups D and consisting of a hydrocarbon chain optionally substituted by groups which are not electron-doublet donors, or of a substituted or unsubstituted, aliphatic or aromatic, cyclic or polycyclic, hydrocarbon residue, or of both of a hydrocarbon chain and a cyclic residue; X represents either an anion, such as a halide, sulphate or nitrate anion, or a cation, such as an alkali metal (e.g., $Na^+$, $K^+$, or $Li^+$), ammonium or quternary ammonium cation; Q represents an oxygen or sulphur atom or an organic radical such as a lower alkyl, cycloalkyl, aryl, lower alkoxy, cycloalkoxy radical; $p$ is an integer equal to or higher than 2, which represents the number of donor groups in the ligand of formula $D_pA$; $s$ is nought or an integer, and $m$ is an integer equal to or higher than 1, $s$ and $m$ being such that $(pm + s)$ has a value lower than the maximum co-ordination number of the metal M; and n is nought (in the case of non-ionisable chelates) or an integer or an improper fraction (in the case of ionisable chelates) corresponding to the number of electrical charges of the grouping $[MQ_s(D_pA)_m]$, which is then a chelate ion.

Although chelates in which the ligand of formula $D_pA$ is tri-, quadri- or quinque-dentate may be employed in the initiator of the present invention, it is preferably to employ chelates in which the ligand or ligands are bidentate. A list of such ligands is given by Dwyer and Mellor loc. cit., pp. 95–132. Suitable such bidentate ligands include: diacids such as oxalic acid, malonic acid or 1-carboxyphenylacetic acid; hydroxy acids such as glycollic acid, lactic acid and salicyclic acid; o-diphenols such as catechol; hydroxyaldehydes such as o-hydroxybenzaldehyde (salicylaldehyde); hydroxy ketones such as o-hydroxyacetophenone; diols such as ethylene gylcol; diamines such as ethylene diamine, 1,3-diamine-propane, o-phenylene-diamine, 1-phenylethylene-1,2-diamine; bis-heterocyclic compounds such as 2,2'-bipyridyl and 1,10-phenanthroline; amino acids such as glycine, anthranilic acid, α- and β-aminobutyric acids, 2-pyrrolidine-carboxylic acid (proline), 1-amino-cyclopentane-carboxylic acid; aminophenols such as o-aminophenol; hydroxylated heterocyclic compounds such as 8-hydroxy-quinoline; hydroxyaldimines such as N-phenyl-o-hydroxy-benzaldimine; thioalcohols such as 2-mercaptoethanol; and thioacids such as thioglycollic acid. A preferred class of bidentate ligands consists of the β-dicarbonyl compounds of the general formula:

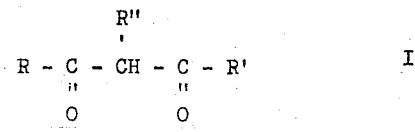

in which R represents a hydrogen atom or a substituted or unsubstituted hydrocarbon radical, or an alkoxy radical, R' represents a substituted or unsubstituted hydrocarbon radical, it being possible for R and R' to be identical when they both represent hydrocarbon radicals, and R'' represents a substituted or unsubstituted hydrocarbon radical, or a hydrogen or chlorine atom. More specifically, the hydrocarbon radicals which may be represented by R and R' include alkyl radicals, such as methyl, ethyl, propyl, butyl and octyl, cycloalkyl radicals, such as cyclopentyl and cyclo-hexyl, aryl radicals, such as phenyl and naphthyl, aralkyl radicals such as benzyl, substituted alkyl radicals such as trifluoromethyl, alkoxyalkyl radicals such as ethoxymethyl; and substituted aryl radicals such as o-methoxyphenyl, 2,3-dichlorophenyl and 4-hydroxyphenyl.

The alkoxy radicals which may be represented by R include more particularly metnoxy, ethoxy, propoxy and butoxy. The hydrocarbon radicals which may be represented by R'' include more particularly lower alkyl radicals such as methyl, ethyl, propyl and butyl.

Two of the symbols R, R' and R'' may also represent in combination a divalent hydrocarbon chain (for example polymethylene), the rings which they then form with the remainder of the molecule then containing five or six carbon atoms.

The dicarbonyl compound is formula II may also be a bicyclic compound in which the group

is common to both rings.

Examples of the compound of formula II are: diketones such as acetylacetone (2,4-pentanedione), 2,4-hexanedione, 2,4-heptanedione, 5-methyl-2,4-hexanedione, 2,4-octanedione, 3-methoxy-2,4-petanedione, 3,5-heptanedione, 1,1,1-trifluoro-2,4-pentanedione, benzoylacetone, dibenzoylmethane, o-methoxybenzoylacetone, 1,1,1-trifluoro-2-benzoylacetone, β-naphthoyl-trifluoroacetone, 3-methyl-2,4-pentanedione, 3-butyl-2,4-pentanedione, 1,3-cyclopentanedione, 1,3-cyclohexanedione, 5,5-dimethyl-1,3-cyclohexanedione (dimedone), 2-acetyl-cyclohexanone, 1,8-hexahydronaphthalenedione, and 1-hydroxy-benzoylacetone;

β-keto-aldehydes such as propionylacetaldehyde, benzoylacetaldehyde, and α-formylcyclohexanone; esters of α-keto-acids such as methyl, ethyl and butyl acetoacetate, and methyl benzoylacetate.

Examples of bidentate chelate compounds which may be used in the invention are: ferrous acetylacetonate, vanadyl acetylacetonate, vanadyl methylacetylacetonate, vanadyl 2-acetylcyclohexanate, vanadyl heptanedionate, vanadyl propionylacetaldehydate, vanadyl benzoylacetaldehydate, dichlorotitanium acetylacetonate, diethyl-tin acetylacetonate, cupric acetylacetonate, vanadyl salicylaldehydate, vanadyl-bis(acetylacetamide), vanadyl-bis(acetylacetanilide), vanadyl thioglycollate, vanadyl anthranilate, ethoxyaluminium acetylacetonate, and vanadyl α-formylcyclohexanonate.

Examples of tridentate ligands are 2,6-bis(α-pyridyl)pyridine and 2-(α-pyridylmethyleneaminomethyl)pyridine, and, of tetradentate ligands, bis-benzoylacetonepropylenediimine.

3. Electron donors

Generally speaking, the electron donor must be a unidentate ligand producing co-ordination by a σ electron doublet. However, if, because of its degree of co-ordination in the chelate compound (2), the metal can only accept one further electron doublet, this new doublet may be supplied by a ligand comprising two or more doublet-donor groups. Generally speaking, the electron donor compound may comprise as the donor group one of those mentioned for the ligands of the chelate compound. Thus, it is possible to employ monoamines such as methylamine, ethylamine, n-butylamine, cyclohexylamine, or diphenylamine; monoalcohols such as methanol, ethanol, propanol, butanol, cyclohexanol or benzyl alcohol; ethers such as dimethyl ether, diethyl ether, dibutyl ether, methyl cyclohexyl ether, methyl phenyl ether, dioxan, and tetrahydrofuran; aldehydes such as formaldehyde, acetaldehyde or benzaldehyde; imines such as acetaldimine; hydroxylamine and its derivatives, such as cyclohexyloxime or benzaldoxime; ketones such as acetone, or methyl ethyl ketone; amides such as acetamide, propionamide, formamide or urea; or sulphur derivatives such as sulphonamides or phosphorus derivatives such as hexamethylphosphotriamide.

Although any compound comprising a doublet-donor atom may be employed, the best results are obtained with compounds whose reducing character is least pronounced, unlike what happens with the previously known ternary redox systems mentioned above. Thus, for a given monomer, the polymer yield is higher with primary amines than with tertiary amines.

As already mentioned the chelate compound (2) and the electron donor (3) may be separately added to the new polymerisation initiator to form a complex in situ, or this chelate/donor complex may be preformed and introduced as such into the initiator combination.

The new initiator is suitable for the polymerisation of olefinic monomers comprising at least one olefinic double bond, and more especially of monomers in which the olefinic double bond is in the α,β-position to an activating grouping. The various monomers which may be polymerised may be represented by the formula:

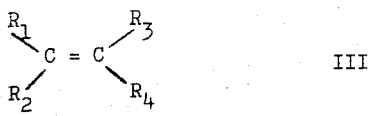

$$\begin{array}{c} R_1 \\ \phantom{R_1}\diagdown \\ \phantom{R_1}C = C \\ \phantom{R_1}\diagup \\ R_2 \end{array} \begin{array}{c} R_3 \\ \diagup \\ \\ \diagdown \\ R_4 \end{array} \quad \text{III}$$

in which $R_1$, $R_2$, $R_3$ and $R_4$ each represent a hydrogen atom, a halogen atom, a functional grouping, or a substituted or unsubstituted hydrocarbon radical. More particularly, $R_1$, $R_2$, $R_3$ and $R_4$ may be chlorine, bromine or fluorine atoms or alkyl, cycloalkyl or aryl radicals, or heterocyclic radicals, or alkoxy, carboxy, alkoxycarbonyl, aryloxycarbonyl, carbamoyl, nitrile, acyl, alkylthio, alkylsulphonyl, arylsulphonyl, aldehyde, alkylcarbonyloxy or arylcarbonyloxy groups.

Suitable monomers include: vinyl chloride, vinylidene chloride, vinyl and allyl esters such as vinyl acetate, propionate and benzoate; acrylic and methacrylic acids and their derivatives such as alkyl acrylates, acrylamide, acrylonitrile, and ethylene-glycol diacrylates; vinyl ketones such as 3-butene-2-one; vinyl ethers such as vinyl ethyl ether; unsaturated aldehydes such as acrolein; vinyl sulphones such as vinylphenylsulphone; heterocyclic compounds substituted by a vinyl group such as vinylpyridines and vinylpyrrolidones; vinyl thioethers such as vinyl ethyl sulphide; and purely hydrocarbon compounds such as divinylbenzene and ethylene. These compounds may be homopolymerised or copolymerised with one another or with copolymerisable resins such as unsaturated polyesters.

The new initiating system may be employed in all modes of polymerisation: in bulk, in solution, in emulsion or in suspension. It is particularly suitable for this last mode of polymerisation, in which use must be made of oil-soluble initiators. In this case, the oxidising agent is preferably an organic peroxide or hydroperoxide, the chelate compound, a chelate of a β-dicarbonyl compound, and the electron donor a compound which is only partially soluble in the monomer.

The temperature at which the polymerisation is carries out may vary from −30° to +100°C, depending upon the initiating system and the monomer employed. Because of their high activity, the new initiating systems make it possible to carry out polymerisations at elevated temperature, i.e., at temperatures above 30°C, employing only extremely small quantities of initiator. It is thus possible to obtain polymers comprising very few initiator residues, and this constitutes an important advantage of the new system over previously known systems. At low temperatures, the new initiators show an activity which is not shared by any of the various constituents taken individually or in pairs.

The quantities of oxidising agent and chelate compound may vary within fairly wide limits. In general, they may be used, in each case, in a molar proportion of 0.0005 percent to 5 percent based on the monomer, although molar proportions from 0.0005 percent to 0.1 percent are generally sufficient. In addition, the molar proportion of chelate compound may generally be lower than the molar proportion of oxidising agent. The quantity of electron donor employed must be, as already stated, at most equal to that which the metal of the chelate is still capable of complexing. When the polymerisation in question is a bulk polymerisation with an electron donor which is soluble in the monomer, or a solution polymerisation in an organic solvent, or a polymerisation in a heterogeneous medium with an electron donor which is soluble only in the monomer, the quantity of electron donor to be added to the reaction medium is at most equal to that which the metal of the chelate is still capable of complexing. On the otherhand, in the case of a polymerisation in a heterogeneous medium with an electron donor which is partially soluble in the phase which does not contain the monomer, the quantity of electron donor to be added may be greater than that which the metal of the chelate is still capable of complexing, so that, taking into account the partition coefficient between the phases, the initiating system present in the phase containing the monomer satisfies the aforesaid condition. In all cases, the quantity of electron donor to be actually added may be readily determined by a simple preliminary test, the polymerisation reaction being inhibited when the quantity of electron donor present in the monomer is greater than that which the metal of the chelate present in this same monomer can complex.

Polymerisations using the new initiators may be carried out in the presence of the usual polymerisation adjuvants; e.g., emulsifiers, suspending agents, and antigels (in the case of low-temperature polymerisations). When the electron donor is alkaline, as is the case with ammonia and the amines, it is preferable, if the monomer is likely to undergo an alkaline hydrolysis, to carry out the operation in the presence of a buffer such as, for example, sodium bicarbonate.

In the case of solution polymerisation, the same organic solvents may be employed as in known processes. However, when the solvent employed is an electron donor (e.g., an alcohol or amide such as dimethylformamide), it is necessary to choose as electron donor in the initiating system a compound which gives with the chelate compound employed a complex which is more stable than that formed with the solvent, i.e., the donor chosen must be able to displace the solvent from the complex which the latter may have formed with the chelate compound. However, it is preferable to employ a solvent which is not an electron donor, e.g., a saturated hydrocarbon such as hexane, heptane or cyclohexane.

The new initiators afford many advantages over previously known catalytic systems. In the first place, they make it possible to carry out polymerisations at low temperature employing as oxidising agents substances which, like lauroyl and benzoyl peroxides, are stable at ambient temperature, while the initiating systems used in earlier low temperature polymerisation processes necessitate the use of compounds which must decompose at sufficient speed at low temperature to initiate the polymerisation, and which consequently exhibit at ambient temperature an instability such that they are capable of causing explosions.

Another advantage of the new initiators resides in the possibility which they afford, because they involve the use of compounds which are soluble in the monomer, of performing low temperature polymerisations by the suspension polymerisation process. Suspension polymerisation in water of vinyl monomers such as vinyl chloride and vinyl acetate affords many advantages over emulsion polymerisation: the polymer is readily recoverable by filtration; in addition, the suspending agents employed for the suspension polymerisation (such as, for example, polyvinyl alcohol or polyvinylpyrrolidone) have the advantage that they may be eliminated by washing the polymer in water, or that they may optionally be left in the polymer without any major disadvantage, while on the other hand the emulsifiers employed in emulsion polymerisation are difficult to eliminate and often catalyse the degradation of the polymer.

In the case of the polymerization of vinyl chloride, the new initiators also make it possible, without employing low temperatures, but simply operating at a temperature of 10°–20°C, to obtain polymers which have thermomechanical properties (elongation, transition point, and Vicat point) similar to those of polymers obtained at lower temperatures with other initiating systems. In addition, a comparative study of the infra-red spectra shows that the polyvinyl chloride thus obtained has substantially the same structure as the polyvinyl chloride obtained by earlier processes at lower temperatures. The tacticity of polyvinyl chloride is assessed by the ratio D of the optical densities of the bands at 1,428 cm$^{-1}$ and at 1,434 cm$^{-1}$ of the infra-red spectrum of the polymer [see Germar, Makrom. Chem. 60, 106, (1963); and Takeda Polym. Sci., 57, 383 (1962)]. This ratio increase with the tacticity of the polymer. Vinyl chloride polymers prepared at a temperature of 10°–20°C with the new initiators have a ratio D similar to the ratio D of polymers obtained at temperatures below 0°C with other initiators, which indicates a similar tacticity in agreement with the similarity of the thermomechanical properties.

The new initiators also make it possible to polymerise α-olefines including more particularly ethylene, at low pressure. By "low pressure" is meant pressures between 1 and 100 bars absolute. Previously, the polymerisation of ethylene with free radical-type catalysts has involved the use of temperatures of 250°C or more and pressures of at least 300 bars, generally 1,000 bars or more.

The following Examples illustrate the invention.

EXAMPLE 1 a. Into a 1-litre glass autoclave equipped with a stirring system, a thermometer tube and a device for charging the reactants through a valve, 400 cc. of deionised water, 1 g. of polyvinyl alcohol having a saponification index of 125, 2 g. of lauroyl peroxide (5.025 × 10$^{-3}$ mol.), 0.650 g. of vanadyl acetylacetonate (2.453 × 10$^{-3}$ mol.) and 0.200 g. of dilaurylamine (5.665 × 10$^{-4}$ mol.) are introduced under nitrogen. Stirring is started, and, while the autoclave is maintained at a temperature of 16°C by circulation of water through a double jacket surrounding the reactor, 100 g. of vinyl chloride (i.e., 1.6 mol.) are introduced. After reaction for 20 hours at 16°C, the autoclave is degassed. The polymer is filtered off and washed with deionised water. After drying in vacuo, 60 g. of polyvinyl chloride (polymer I) are obtained. The viscosity index of a solution having a concentration of 5 g/l. in cyclohexanone at 25°C is 282 cm$^3$/g. The degree of conversion is 60 percent.

b. The same procedure is followed as in part (a), but with the following initiator: lauroyl peroxide (2.5 × 10$^{-3}$ mol.), vanadyl acetylacetonate (6.3 × 10$^{-4}$ mol.), and NH$_4$OH ($d$ × 0.900, 2cc., 10$^{-1}$ mol.). 70 g. of polyvinyl chloride (polymer II) having a viscosity index of 402 cm$^3$/g. are obtained.

c. Another polymer is prepared (polymer III) by polymerisation of vinyl chloride at −10°C in suspension in the presence of tichloroacetyl peroxide. A product having a viscosity index of 325 cm$^3$/g. is obtained.

d. Another polyvinyl chloride (polymer IV) is prepared by polymerisation at 60°C in the presence of lauroyl peroxide. This polymer has a viscosity index of 100 cm$^3$/g.

These polymers are examined by infra-red spectrography, and for each the ratio D of the optical densities at 1,428 cm$^{-1}$ and 1,434 cm$^{-1}$ is determined; this ratio expresses the degree of syndiotacticity of the polymers. In addition, the transition temperature, the Vicat point and the elongation at 90°C under 50 kg/cm$^2$ of the same polymers are determined. These results are all set out in the following Table:

| Polymer | Transition point °C | Vicat point °C | Elongation % | D |
|---|---|---|---|---|
| I | 83.5 | 119 | 50 | 1.53 |
| II | 83 | 134 | 50 | 1.48 |
| III | 85 | 123 | 22 | 1.50 |
| IV | 76.5 | 95 | 170 | 1.25 |

These results show the similarity of the properties of polymers I and II obtained at +16°C by the new process with those of polymer III obtained at −10°C by a known process. Polymer IV, prepared at 60°C by a known process, is quite different.

EXAMPLE 2

The procedure of Example 1 is followed, with the following starting materials: water (400 cc.), benzoyl peroxide (5.16 × 10$^{-3}$ mol.), ferrous acetylacetonate (5.16 × 10$^{-3}$ mol.), pyridine (1.58 × 10$^{116\ 3}$ mol.), polyvinylpyrrolidone (index K = 90, 1 g.), and vinyl chloride (1.6 mol.). As in Example 1, the operation is carried out at 16°C for 20 hours, and a product having a viscosity index of 237 cm$^3$/g. is obtained, in a yield of 95 percent.

When ferrous acetylacetonate is replaced by ferric acetylacetonate, in which the iron is completely coordinated, no polymerisation occurs.

EXAMPLE 3

In the autoclave of Example 1, a series of polymerisation experiments as in Example 1 is performed, the dilaurylamine being replaced by diphenylamine and the quantities of vanadyl acetylacetonate and amine being varied as indicated in the following Table, which also gives the results obtained:

| Experiment | Lauroyl peroxide (moles) | Vanadyl acetylacetonate (moles) | Diphenylamine (moles) | Yield of polymer % | Viscosity index (cm$^3$/g.) |
|---|---|---|---|---|---|
| A | 5 × 10$^{-3}$ | 2.4 × 10$^{-3}$ | 6.15×10$^{-4}$ | 70 | 257 |
| B | do. | do. | 1.23×10$^{-3}$ | 67 | 188 |
| C | do. | 1.2 × 10$^{-3}$ | do. | 50 | 156 |
| D | do. | do. | 4.92×10$^{-3}$ | 31 | insoluble, cross-linked polymer |

These experiments show that an increase in the quantity of diphenylamine (i.e., electron donor) employed results, beyond certain values, in an appreciable lowering of the yield and of the viscosity index, and may cause some cross-linking of the polymer.

EXAMPLE 4

By the procedure of Example 1, the following comparative experiments are carried out:

| Experiment | Temperature of polymerisation °C | Lauroyl peroxide (moles) | Vanadyl acetyl-acetonate (moles) | Ammonium hydroxide (moles) | Degree of conversion % | Viscosity index (cm³/g.) |
| --- | --- | --- | --- | --- | --- | --- |
| A | 23 | $1.25 \times 10^{-3}$ | $1.25 \times 10^{-3}$ | none | 1 | — |
| B | 40 | do. | do. | none | 5 | 81 |
| C | 40 | do. | none | $10^{-1}$ | 6 | 102 |
| D | 40 | do. | $1.25 \times 10^{-3}$ | $10^{-2}$ | 92 | 158 |
| E | 40 | do. | do. | $10^{-1}$ | 89 | 158 |

Experiments A, B and C show that in the absence either of the electron donor or of the chelate compound, the degree of polymerisation is low, even when the temperature is increased. On the other hand, the addition of a small quantity of ammonia, of which only a small proportion is effective in the initiator because of its low solubility in the monomer, brings the degree of the conversion to 92 percent.

EXAMPLE 5

A series of comparative experiments is carried out as in Example 1, the polymerisation being effected for 20 hours at 16°C with the quantities of lauroyl peroxide, vanadyl acetylacetonate and electron donor indicated in the following Table, which also gives the results obtained.

| Experiment | Lauroyl peroxide (moles) | Vanadyl acetylacetonate (moles) | Electron donor (moles) | Degree of conversion % | Viscosity index (cm³/g.) |
| --- | --- | --- | --- | --- | --- |
| A | $1.25 \times 10^{-3}$ | $1.25 \times 10^{-3}$ | n-butylamine $1.2 \times 10^{-2}$ | 45 | 370 |
| B | do. | do. | n-butylamine $1.2 \times 10^{-3}$ | 45 | — |
| C | do. | do. | di(n-butyl)-amine $1.2 \times 10^{-3}$ | 25 | — |
| D | do. | do. | tri(n-butyl)-amine $1.2 \times 10^{-3}$ | 2 | — |

Because of the partition coefficient of this amine between the monomer and the aqueous phase, the molar proportion of amine to chelate in the monomer is in fact lower than 1:1.

Because of the partition coefficient of this amine between the monomer and the aqueous phase, the molar proportion of amine to chelate in the monomer is in fact lower than 1:1.

Experiments A, B, C, and D show that the degree of conversion falls when the primary amine is replaced by a secondary or tertiary amine, the reducing power of which increases with the degree of substitution.

EXAMPLE 6

A series of comparative experiments is carried out as in Example 1, the polymerisation being effected at 16°C for 19 hours employing polyvinylpyrrolidone having an index K = 90 as suspending agent, and with the quantities of cumene hydroperoxide, vanadyl acetylacetonate and cyclohexylamine given in the following Table, in which the results obtained are also set out:

| Experiment | Cumene hydroperoxide (moles) | Vanadyl acetylacetonate (moles) | Cyclohexylamine (moles) | Degree of conversion % | Viscosity index (cm³/g.) |
| --- | --- | --- | --- | --- | --- |
| A | $1.25 \times 10^{-3}$ | $1.25 \times 10^{-3}$ | $2.5 \times 10^{-3}$ | 40 | 225 |
| B | $3.5 \times 10^{-3}$ | $3.5 \times 10^{-3}$ | none | 24 | 94 |
| C | do. | none | do. | 0 | — |

Experiments A and B show that in the absence of the electron donor, even when the peroxide/chelate system is increased by $2.25 \times 10^{-3}$ mol., the polymerisation yield falls (to 24 percent instead of 40 percent), and that in addition an appreciable lowering of the viscosity index of the polymer occurs. The transition point is 72.5°C for the polymer of experiment B against 80°C for the polymer of experiment A (a value similar to that of the polymers I and II of Example 1).

EXAMPLES 7 TO 14

By the procedure of Example 1, a series of experiments is carried out, the polymerisation being continued for 20 hours in each case at the temperature indicated in the Table the constituents of the initiating system and the results being also given in the Table:

| Example | Polymerisation temperature °C | Lauroyl peroxide (moles) | Chelate (moles) | Electron donor (moles) | Degree of conversion % | Viscosity Index (cm³/g.) |
|---|---|---|---|---|---|---|
| 7 | 16° | $1.25 \times 10^{-3}$ | vanadyl acetylacetonate $1.25 \times 10^{-3}$ | monomethylamine* $1.35 \times 10^{-2}$(a) | 16 | 405 |
| 8 | 10° | do. | do. | do. | 13 | 710 |
| 9 | 16° | do. | do. | triethylamine* $8.9 \times 10^{-3}$(b) | 36 | 384 |
| 10 | do. | do. | do. | diethylamine* $1.25 \times 10^{-3}$ | 43 | 382 |
| 11 | 10° | $5 \times 10^{-3}$ | vanadyl acetylacetonate $2.4 \times 10^{-3}$ | diphenylamine $6.15 \times 10^{-4}$ | 48 | 353 |
| 12 | 16° | do. | vanadyl methylacetylacetonate $2.4 \times 10^{-3}$ | do. | 76 | 256 |
| 13 | do. | do. | vanadyl 2-acetylcyclohexanonate $2.4 \times 10^{-3}$ | do. | 30 | 150 |
| 14 | do. | do. | vanadyl heptanedionate $2.4 \times 10^{-3}$ | do. | 59 | 230 |

* For these amines, the quantity of amine employed is not in fact that which acts in the initiator system. Since these amines are very soluble in water, only a part, that corresponding to the solubility in vinyl chloride, is utilised in the initiator.
(a) Employed as a 30% weight-by-volume aqueous solution in a quantity of 1.4 cc.
(b) Employed as a 25% weight-by-volume aqueous solution in quantity of 3.6 cc.

For these amines, the quantity of amine employed is not in fact that which acts in the initiator system. Since these amines are very soluble in water, only a part, that corresponding to the solubility in

EXAMPLES 15 to 43

By the procedure of Example 1, a series of Examples is carried out, the constituents of the initiator and the results being as given in the following Table:

| Example | Duration (hours) | Polymerisation temperature °C | Oxidant (moles) | Chelate (moles) | Electron Donor (moles) | Degree of Conversion % | Viscosity Index (cm³/g) |
|---|---|---|---|---|---|---|---|
| 15 | 20 | 16 | lauroyl peroxide $2.5 \times 10^{-3}$ | vanadyl acetylacetonate $2.4 \times 10^{-3}$ | NH₄CH $10^{-1}$ | 97 | 296 |
| 16 | do. | 40 | do. $1.25 \times 10^{-3}$ | do. $1.25 \times 10^{-3}$ | do. $10^{-2}$ | 92 | 158 |
| 17 | do. | −10 | do. $2.5 \times 10^{-3}$ | do. $6.3 \times 10^{-4}$ | do. $10^{-1}$ | 20 | 740 |
| 18 | do. | 16 | do. $2.5 \times 10^{-3}$ | do. $7.9 \times 10^{-5}$ | do. $10^{-1}$ | 37 | 592 |
| 19 | do. | 16 | 2,4 dichlorobenzoyl peroxide $2 \times 10^{-3}$ | do. $1.23 \times 10^{-3}$ | do. $10^{-1}$ | 79 | 391 |
| 20 | 26 | 16 | cumene hydroperoxide $1.25 \times 10^{-3}$ | do. $1.25 \times 10^{-3}$ | do. $2.2 \times 10^{-2}$ | 46 | 250 |
| 21 | 24 | 16 | 2,4-dichlorobenzoyl peroxide $1.25 \times 10^{-3}$ | vanadyl propionylacetaldehydrate $1.25 \times 10^{-3}$ | NH₄CH $2.2 \times 10^{-2}$ | 24 | — |
| 22 | do. | do. | do. | vanadyl benzoylacetaldehydrate $1.25 \times 10^{-3}$ | do. | 19 | — |
| 23 | 24 | 16 | do. | vanadyl propionylacetaldehydrate $1.25 \times 10^{-3}$ | do. | 24 | — |
| 24 | do. | do. | do. | vanadyl benzoylacetaldehydrate $1.25 \times 10^{-3}$ | do. | 19 | — |
| 25 | 22 | 16 | do. | dichlorotitanium acetylacetonate $1.25 \times 10^{-3}$ | do. | 45 | — |
| 26 | 24 | do. | do. | diethyl-tin acetylacetonate $1.25 \times 10^{-3}$ | do. | 62 | — |
| 27 | 22 | 16 | 2,4-dichlorobenzoyl peroxide $1.25 \times 10^{-3}$ | cupric acetylacetonate $1.25 \times 10^{-3}$ | NH₄OH $2.2 \times 10^{-2}$ | 40 | — |

| Example | Duration (hours) | Polymerisation temperature °C | Oxidant (moles) | Chelate (moles) | Electron Donor (moles) | Degree of Conversion % | Viscosity Index (cm³/g) |
|---|---|---|---|---|---|---|---|
| 28 | 24 | do. | do. | vanadyl salicyladehydrate $1.25 \times 10^{-3}$ | do. | 44 | — |
| 29 | do. | do. | do. | vanadyl bis(acetyl-acetamide) $1.25 \times 10^{-3}$ | do. | 29 | — |
| 30 | do. | do. | do. | vanadyl bis(acetyl-acetanilide) $1.25 \times 10^{-3}$ | do. | 41 | — |
| 31 | do. | do. | do. | vanadyl thioglycolate $1.25 \times 10^{-3}$ | do. | 6 | — |
| 32 | do. | do. | do. | vanadyl anthranilate $1.25 \times 10^{-3}$ | do. | 15 | — |
| 33 | 21 | 16 | 2,4-dichlorobenzoyl peroxide $1.25 \times 10^{-3}$ | vanadyl acetylacetonate $1.25 \times 10^{-3}$ | acetamide $2.2 \times 10^{-3}$ | 61 | — |
| 34 | do. | do. | do. | do. | diethyl ether $1.15 \times 10^{-2}$ | 63 | — |
| 35 | do. | do. | do. | do. | dioxane $1.85 \times 10^{-2}$ | 72 | — |
| 36 | do. | do. | do. | do. | urea $2.1 \times 10^{-2}$ | 70 | — |
| 37 | do. | do. | do. | zinc acetylacetonate $1.25 \times 10^{-3}$ | diethyl ether $1.15 \times 10^{-2}$ | 11 | — |
| 38 | do. | do. | lauroyl peroxide $1.25 \times 10^{-3}$ | vanadyl acetylacetaonate $1.25 \times 10^{-3}$ | hydrazine $2.1 \times 10^{-2}$ | 39 | — |
| 39 | 22 | 17 | 2,4-dichlorobenzoyl peroxide $1.25 \times 10^{-3}$ | ethoxyaluminium acetyl-acetonate $1.25 \times 10^{-3}$ | NH₄OH $2.2 \times 10^{-2}$ | 44 | — |
| 40 | do. | 16 | di-(t-butyl) peroxide $1.24 \times 10^{-3}$ | manganous acetyl-acetonate $1.25 \times 10^{-3}$ | do. | 53 | — |
| 41 | 24 | do. | 2,4-dichlorobenzoyl peroxide $1.25 \times 10^{-3}$ | titanyl acetylacetonate $1.25 \times 10^{-3}$ | do. | 63 | — |
| 42 | 19 | do. | do. | ethyl titanyl-bis(acetyl-acetate $1.25 \times 10^{-3}$ | do. | 12 | — |
| 43 | do. | 15 | 3-isopropyl-3-butyl-oxazirane $1.25 \times 10^{-3}$ | vanadyl acetylacetonate $1.25 \times 10^{-3}$ | do. | 26 | — |

EXAMPLE 44

A vanadyl acetylacetonate/butylamine complex is prepared by the method of Clauch et al., J. Amer. Chem. Soc. 83, 1073 (1961), from 0.01 mol. of the chelate and 0.01 mol. of the amine. A maroon-green crystalline product is obtained in a yield of 60 percent, which is identified by analysis and ultra-violet spectrography as the complex of the formula:

$$VO(C_5H_7O_2)_2 \cdot C_4H_9NH_2.$$

Vinyl chloride is polymerised in the autoclave employed in Example 1 at 16°C for 18 hours using the following starting materials: water (400 cc.), vinyl chloride (100 g.), polyvinylpyrrolidone (1 g.), 2,4-dichlorobenzoyl peroxide ($1.25 \times 10^{-3}$ mol.) and $VO(C_5H_7O_2)_2 \cdot C_4H_9NH_2$ ($1.25 \times 10^{-3}$ mol.). The degree of conversion into polymer amounts to 80 percent.

EXAMPLE 45

Into the apparatus described in Example 1, distilled water (400 cc.), polyvinylpyrrolidone having an index $k \times 90$ (1 g.), ammonium persulphate ($1.25 \times 10^{-3}$ mol.), vanadyl acetylacetonate ($1.25 \times 10^{-3}$ mol.), and ammonia ($2.2 \times 10^{-2}$ mol. in the form of an aqueous solution having a density of 0.900) are introduced. After reaction for 19 hours at 16°C, the degree of conversion is 73 percent into a polymer partially soluble in cyclohexanone.

EXAMPLE 46

An emulsion polymerisation is carried out by replacing the polyvinylpyrrolidone of Example 45 by sodium dodecylbenzenesulphonate (0.8 g.) as emulsifier. The other materials introduced into the autoclave are water (400cc.), vinyl chloride (100 g.), $KBrO_3$ ($2.5 \times 10^{-3}$ mol.), vanadyl acetylacetonate ($1.25 \times 10^{-3}$ mol.), diethyl ether ($1.15 \times 10^{-2}$ mol.), and $NaHCO_3$ (1.6 g.), as buffering agent for the medium. In 20 hours at 16°C, a polymer having a viscosity of 285 cc/g. is obtained with a degree of conversion of 94 percent.

EXAMPLE 47

An emulsion polymerisation is carried out as in Example 46, the sodium dodecylbenzenesulphonate being replaced by 1 g. of polyethyleneglycol stearate as emulsifier. The other materials introduced into the autoclave are: vinyl chloride (100 g.), $Ce(NO_3)_4 \cdot 2NH_4NO_3$ ($2.5 \times 10^{-3}$ mol.), vanadyl acetylacetonate ($1.25 \times 10^{-3}$ mol.), and diethyl ether ($1.15 \times 10^{-2}$ mol.). After 20 hours at 16°C, the degree of conversion is 15 percent.

EXAMPLES 48 TO 51

A series of Examples of the solution polymerisation of vinyl chloride (1.6 mol.) is carried out under the conditions given in the following Table with the results shown.

| Example | Duration (hours) | Polymerisation temperature °C | Oxidant (moles) | Solvent (cm³) | Chelate (moles) | Electron donor (moles) | Degree of conversion % |
|---|---|---|---|---|---|---|---|
| 48 | 18 | 16 | potassium bromate 2.5 ×10⁻³ | methanol 300 | vanadyl acetylacetonate 2.5×10⁻³ | cyclohexylamine 2.5×10⁻³ | 20 |
| 49 | 19 | 16 | lauroyl peroxide 2.5×10⁻³ | hexane 200 | vanadyl 3-chloroacetylacetonate 2.5×10⁻³ | do. | 43 |
| 50 | 2 | 20 | do. | methanol 300 | vanadyl acetylacetonate 2.5×10⁻³ | isopropylamine 2.5×10⁻³ | 27 |
| 51 | 3 | 16 | do. | methanol 400 | do. | $NH_4OH$ $5\times10^{-2}$ | 42 |

EXAMPLE 52

Into a 500-cc. round-bottomed flask provided with a stirring system, a nitrogen supply duct and a thermometer tube and immersed in a bath maintained at 15°C, vinyl acetate (100 g., 1.162 mol.), water (200 cc.), and polyvinylpyrrolidone (1 g.) are introduced. After purging the flask with nitrogen, an initiating system comprising 2,4-dichlorobenzoyl peroxide ($2.5 \times 10^{-3}$ mol.), vanadyl acetylacetonate ($2.5 \times 10^{-3}$ mol.), and ammonia ($1.1 \times 10^{-2}$ mol.) is added. After 21 hours at 15°C, the reaction is stopped, and the polymer is then filtered off, washed on the filter with distilled water, and dried in vacuo. 70 g. of polymer having a viscosity index of 47 cm³/g. (measured on an 0.5 percent solution in cyclohexanone) are obtained.

EXAMPLES 53 TO 76

The experiment of Example 52 is repeated, the conditions of the reaction being varied, and the components of the initiating system and the monomers employed being those indicated in the following Table, in which the results obtained are also set out.

| Example | Monomer (g.) | Polymerisation temperature (°C.) | Duration (hours) | Mode of polymerisation | Reaction medium (g.) | Buffer (g.) | Suspending agent (g.) | Emulsifier (g.) | Oxidant (moles) | Chelate (moles) | Electron donor (moles) | Degree of conversion (percent) and viscosity index (cm.$^3$/g.) |
|---|---|---|---|---|---|---|---|---|---|---|---|---|
| 53 | Vinyl acetate (200, 2.324 mole) | 30 | 5 | Suspension | Water (400) | | PVP$^1$ (0.8) | | 2,4-dichlorobenzoyl peroxide (2.5×10$^{-3}$) | Vanadyl acetylacetonate (2.5×10$^{-3}$) | NH$_4$OH (1.1×10$^{-2}$) | 62 / 78.5 |
| 54 | do | 30 | 16 | do | do | | PVP$^1$ (0.8) | | 2,4-dichlorobenzoyl peroxide (1.25×10$^{-3}$) | Vanadyl acetylacetonate (1.25×10$^{-3}$) | NH$_4$OH (5.5×10$^{-3}$) | 65 / 132 |
| 55 | do | 30 | 16 | do | do | | PVP$^1$ (0.8) | | do | do | Diethyl ether (10$^{-2}$) | 60 / 130 |
| 56 | Vinyl acetate (100) | 30 | 16 | do | Water (200) | NaHCO$_3$ (0.042) | PVP$^1$ (0.4) | | 2,4-dichlorobenzoyl peroxide (6.3×10$^{-4}$) | Vanadyl acetylacetonate (6.3×10$^{-4}$) | Dibutyl ether (2.5×10$^{-3}$) | 53 / 131 |
| 57 | Vinyl acetate (200) | 30 | 16 | do | Water (400) | NaHCO$_3$ (0.084) | PVP$^1$ (0.8) | | 2,4-dichlorobenzoyl peroxide (1.25×10$^{-3}$) | Vanadyl acetylacetonate (1.25×10$^{-3}$) | Tetrahydrofuran (10$^{-2}$) | 86 / 133 |
| 58 | Vinyl acetate (200, 2.324 mole) | 15 | 4 | Emulsion | do | NaHCO$_3$ (0.670) | | Sinnopon ASD$^2$ (0.8) | KBrO$_3$ (6.3×10$^{-4}$) | Vanadyl acetylacetonate (3.15×10$^{-4}$) | Tetrahydrofuran (5×10$^{-3}$) | 97 / 510 |
| 59 | do | 15 | 20 | do | do | NaHCO$_3$ (0.670) | | do | do | Vanadyl acetylacetonate (8×10$^{-5}$) | Tetrahydrofuran (1.25×10$^{-4}$) | 92 / 600 |
| 60 | do | 0 | 1½ | do | do | NaHCO$_3$ (0.670) | | do | KBrO$_3$ (2.5×10$^{-3}$) | Vanadyl acetylacetonate (1.25×10$^{-3}$) | Tetrahydrofuran (10$^{-2}$) | 96 |
| 61 | Vinyl acetate (100) | 0 | 23 | Suspension | Water (200) | | PVP$^1$ (0.4) | | Lauroyl peroxide (1.25×10$^{-3}$) | Titanyl acetylacetonate (1.25×10$^{-3}$) | NH$_4$OH (5.5×10$^{-3}$) | 21 |
| 62 | Vinyl acetate (200) | 0 | 24 | do | do | | Hydroxymethylcellulose (0.4) | | 2,4-dichlorobenzoyl peroxide (1.25×10$^{-3}$) | Vanadyl salicylaldehydate (1.25×10$^{-3}$) | NH$_4$OH (1.1×10$^{-2}$) | 20 |
| 63 | Vinyl acetate (100) | 15 | 24 | do | do | | do | | do | Vanadyl-bis (acetylacetamide) (1.25×10$^{-3}$) | NH$_4$OH (1.1×10$^{-2}$) | 39 |
| 64 | do | 15 | 24 | do | do | | do | | do | Vanadyl-bis (acetylacetanilide) (1.25×10$^{-3}$) | NH$_4$OH (1.1×10$^{-2}$) | 11 |
| 65 | do | 15 | 24 | do | do | | do | | do | Vanadyl thioglycolate (1.25×10$^{-3}$) | NH$_4$OH (1.1×10$^{-2}$) | 29 |
| 66 | do | 15 | 24 | do | do | | do | | do | Vanadyl anthanilate (1.1×10$^{-3}$) | NH$_4$OH (1.1×10$^{-2}$) | 47 |
| 67 | Vinyl benzoate (50, 0.344 mole) | 15 | 19 | Solution | Methanol (150 cm.$^3$) | | | | Lauroyl peroxide (1.25×10$^{-3}$) | Vanadyl acetylacetonate (1.25×10$^{-3}$) | NH$_4$OH (5.5×10$^{-3}$) | 40 |

—Continued

| Example | Monomer (g.) | Polymerisation temperature (°C.) | Duration (hours) | Mode of polymerisation | Reaction medium (g.) | Buffer (g.) | Suspending agent (g.) | Emulsifier (g.) | Oxidant (moles) | Chelate (moles) | Electron donor (moles) | Degree of conversion (percent) and viscosity index (cm.³/g.) |
|---|---|---|---|---|---|---|---|---|---|---|---|---|
| 68 | ...do... | 15 | 23 | Suspension | Water (200) | | PVP¹ (0.4) | | ...do... | ...do... | NH₄OH (5.5×10⁻³) | 29 |
| 69 | Acrylonitrile (53, 1 mole) | 19 | 24 | Solution | DMF³ (200 cm.³) | | | | Lauroyl peroxide (4.6×10⁻³) | Vanadyl acetylacetonate (4.6×10⁻³) | NH₄OH (1.1×10⁻²) | 40 |
| 70 | Acrylonitrile (100) | 16 | 24 | Suspension | Water (200) | | PVP¹ (0.4) | | 2,4-dichlorobenzoyl peroxide (1.25×10⁻³) | Vanadyl 𝛾-formyl-cyclohexanonate (1.25×10⁻³) | NH₄OH (2.2×10⁻²) | 55 |
| 71 | ...do... | 16 | 24 | ...do... | ...do... | | PVP¹ (0.4) | | ...do... | Vanadyl propionyl-acetaldehyde (1.25×10⁻³) | NH₄OH (2.2×10⁻²) | 49 |
| 72 | ...do... | 16 | 24 | ...do... | ...do... | | PVP¹ (0.4) | | ...do... | Vanadyl benzoylacetaldehydate (1.25×10⁻³) | NH₄OH (2.2×10⁻²) | 50 |
| 73 | ...do... | 20 | 5 | Mass | None | | | | Benzoyl peroxide (1.25×10⁻³) | Ferrous acetylacetonate (1.25×10⁻³) | Piperidine (1.25×10⁻³) | 90 |
| 74 | Vinylidene chloride (100, 1.03 mole) | 16 | 21 | ...do... | Water (300) | | PVP¹ (1) | | 2,4-dichlorobenzoyl peroxide (1.25×10⁻³) | Vanadyl acetylacetonate (1.25×10⁻³) | NH₄OH (2.2×10⁻²) | 48 |
| 75 | But-3-en-2-one (50, 0.715 mole) | 16 | 16 | ...do... | Water (100) | | PVP¹ (0.2) | | 2,4-dichlorobenzoyl peroxide (6.3×10⁻⁴) | Vanadyl acetylacetonate (6.3×10⁻⁴) | NH₄OH (5.5×10⁻³) | 40 |
| 76 | Vinyl acetate (200) | 40 | 21 | Emulsion | Water (400) | NaHCO₃ (0.67) | | Sinnopon ASD² | KClO₄ (2.5×10⁻³) | Vanadyl acetylacetonate (1.25×10⁻³) | Urea (2×10⁻²) | 93 / 280 |

¹ PVP = polyvinylpyrrolidone.
² Sinnopon ASD = sodium dodecylbenzene-sulphonate.
³ DMF = dimethylformamide.

EXAMPLES 77 TO 81

In the apparatus of Example 1, a series of copolymerisation experiments was carried out under the conditions indicated by the data given in the following Table, which also gives the results obtained.

is effected at 16°C under a pressure of 5 bars for 18 hours. 1,130 g. of copolymer (a degree of conversion of 25 percent) having a viscosity index, measured as in Example 82, of 116 cm$^3$/g. are obtained. The copolymer contains 92.5 percent by weight of vinyl chloride and 7.5 percent by weight of propylene.

| Example | Monomers | Polymerisation temperature °C | Pressure (bars) | Duration (hours) | Reaction medium (g.) | Emulsifier (g.) | Suspending agent (g.) |
|---|---|---|---|---|---|---|---|
| 77 | vinylacetate 0.7 mole/propylene 1.49 mole | 15 | 7 | 21 | water (250) | — | hydroxymethylcellulose (0.55) |
| 78 | do. | do. | do. | 24 | do. | — | do. |
| 79* | vinylchloride 1.6 mole/vinylacetate 1.16 mole | 20 | 2.2 | 2¼ | do. (400) | SINNOPON ADG(1) (0.8) | — |
| 80* | do. | 15 | do. | 18 | do. | do. | — |
| 81** | vinylacetate 2.18 moles/ethylene 6.8 moles | 16.5 | 38 | 21 | do. | do. | — |

| Example | Oxidant (moles) | Chelate (moles) | Electron donor (moles) | Degree of conversion (%) | Viscosity index (cm$^3$/g.) | Composition of copolymer in % by weight | |
|---|---|---|---|---|---|---|---|
| 77 | 2,4-dichlorobenzoyl peroxide ($7.4 \times 10^{-3}$) | vanadyl acetylacetonate ($3.7 \times 10^{-3}$) | NH$_4$OH ($1.2 \times 10^{-2}$) | 21 | — | vinylacetate propylene | 87% 13% |
| 78 | do. ($5 \times 10^{-3}$) | do. ($2.5 \times 10^{-3}$) | do. ($1.1 \times 10^{-2}$) | 19 | — | vinylacetate propylene | 86.5% 13.5% |
| 79* | KBrO$_3$ ($2.5 \times 10^{-3}$) | vanadyl acetylacetonate $1.25 \times 10^{-3}$) | tetrahydrofuran ($9.3 \times 10^{-3}$) | 83.5 | 130 (at 25°C in solution at 5 g/l cyclohexanone) | vinylchloride vinylacetate | 62.5% 37.5% |
| 80* | do. ($6.2 \times 10^{-4}$) | do. ($3.1 \times 10^{-4}$) | do. ($2.3 \times 10^{-3}$) | 91 | 189 | vinylchloride vinylacetate | 62.5% 37.5% |
| 81** | do. ($5 \times 10^{-3}$) | do. ($2.5 \times 10^{-3}$) | do. ($4 \times 10^{-2}$) | 33.5 | 78 in toluene | vinylacetate ethylene | 73% 27% |

* experiment conducted in the presence of 0.67 g. of NaHCO$_3$ to buffer the medium
** experiment conducted in the presence of 1.26 g. of NaHCO$_3$ to buffer the medium
(1) SINNOPON ASD sodium dodecylbenzene-sulphonate.

EXAMPLE 82

Lauroyl peroxide (0.1 mol.), vanadyl acetylacetonate (0.1 mol.), NH$_4$OH (0.44 mol.), methanol (10 l.), vinyl chloride (64 mol., 4,000 g.), and ethylene (53 mol. 1,490 g.) are introduced into a 25-litre stainless steel autoclave. The pressure in the autoclave is 18 bars. The temperature is maintained at 16°C for 21 hours with stirring. 2,200 g. of copolymer comprising 91.5 percent by weight of vinyl chloride and 8.5 percent by weight of ethylene are obtained. The degree of conversion is 40 percent. The viscosity of the copolymer, measured on a solution having a concentration of 5 g/l. in a mixture of monochlorobenzene and cyclohexanone (50/50) at 25°C, is 74 cm$^3$/g.

EXAMPLE 83

A vinyl chloride/propylene copolymer is prepared by suspension polymerisation, the operation being carried out in the apparatus employed in Example 82, using the following starting materials: 2,4-dichlorobenzoyl peroxide (0.075 mol.), vanadyl acetylacetonate (0.0375 mol.), NH$_4$OH (0.66 mol.), water (9 l.), hydroxymethylcellulose (18 g.), vinyl chloride (68 mol., 3,750 g.), and propylene (17.8 mol., 750 g.). The polymerisation

EXAMPLE 84

A 3.6-litre stainless-steel autoclave equipped with a stirrer consisting of a frame rotating at 240 r.p.m., with a device for the introduction of the reactants and a gas inlet, is purged with nitrogen and there are then introduced under a stream of nitrogen: methanol (1,000 cc.), lauroyl peroxide (8 g., 0.0201 mol.), vanadyl acetylacetonate (5.2 g., 0.0196 mol.) an aqueous NH$_4$OH solution ($d = 0.926$, 4 cc., i.e., 0.0474 mol.), and finally ethylene to a pressure of 50 bars. Stirring is continued for 18 hours at 17°C. After releasing the residual ethylene, 31 g. of a white powder shown to be polyethylene in infra-red spectrography are obtained. The melting point determined by differential thermal analysis is 123°–124°C.

EXAMPLE 85

The procedure of Example 84 is adopted, the methanol being replaced by cyclohexane (1,020 g.) and the ammonia by n-butylamine (4.3 cc., 0.0435 mol.), and the ethylene being introduced to a pressure of 45 bars. After 6 hours at 17°C, 50 g. of polyethylene, m.p. 125°C, are obtained.

I claim:
1. Process for the polymerization of an olefinic monomer selected from the group consisting of a vinyl chloride, a vinylidene chloride, ethylene, propylene, a mixture of said monomers, and a mixture of said monomer with a vinyl ester which comprises contacting said monomer, at a temperature from −30° to +100°C, with a polymerization initiator consisting essentially of a combination of (1) an oxidizing agent selected from the group consisting of hydrogen peroxide, persulphates, permanganates, chlorates, perchlorates, bichromates, bromates, ceric salts, oxaziranes, and organic peroxides and hydroperoxides, (2) a chelate compound of a metal in which compound the metal is still capable of accepting one or more electron pairs from an electron donor, the said chelate compound having the formula:

$$X_n[MQ_s(D_pA)_m]$$

in which X represents an anion or a cation; $n$ is zero, in the case of non-ionizable chelates, or an integer or an improper fraction, in the case of ionizable chelates, equal to the number of electrical charges of the ionic grouping $$[MQ_s(D_pA)_m];$$

M is titanium, iron, vanadium, aluminum, tin, manganese, chromium, cobalt, copper, zinc, or bismuth; Q is an oxygen or sulphur atom or a lower alkyl or lower alkoxy group; D is an electron doublet donor group selected from the group consisting of carbonyl, carboxyl, amino, imino, amido, hydroxy, and mercapto; A joins together the D radicals and either is a valence bond or a hydrocarbon chain of up to 12 carbon atoms carrying the groups D terminally or at any point on or in the chain, the said chain being linear or branched and unsubstituted or substituted by an aromatic or a cycloaliphatic residue or is a polyvalent cyclic aromatic residue, p is an integer equal to or higher than 2, which is the number of donor groups in the ligand of formula DpA, s is zero or an integer, and m is an integer equal to or higher than 1, s and m being such that pm + s has a value lower than the maximum coordination number of the metal M, the ratio of the number of gram-atoms of M to the number of moles of oxidizing agent being equal to or greater than 0.24:1 and (3) an electron donor in amount at most equal to that required to complex completely the metal of the chelate compound, the said electron donor being selected from the group consisting of amines, alcohols, ethers, aldehydes, ketones, imines, oximes, amides, sulphonamides, and phosphonamides, the molar proportions of said components (1) and (2) of the said initiator being each 0.0005 to 5 percent based on the monomer.

2. Process according to claim 1 in which the olefinic monomer is vinyl chloride, a mixture of vinyl chloride and vinyl acetate, ethylene, or a mixture thereof.

3. Process according to claim 1 in which the polymerization is effected at an absolute pressure of 1 to 100 bars.

4. Process according to claim 1 in which the said chelate compound is vanadyl acetylacetonate, ferrous acetylacetonate, vanadyl methylacetylacetonate, vanadyl 2-acetylcyclohexanate, vanadyl heptanedionate, vanadyl propionyl acetaldehydate, vanadyl benzoyl acetaldehydate, dichloro-titanium acetylacetonate, diethyl-tin acetylacetonate, cupric acetylacetonate, vanadyl salicylaldehydate, vanadyl-bis(acetyl acetamide), vanadyl-bis(acetylacetanilide), vanadyl thioglycollate, vanadyl anthranilate, zinc acetylacetonate, ethoxy aluminum acetylacetonate, manganous acetylacetonate, titanylacetylacetonate, ethyl titanyl-bis(acetylacetonate), vanadyl 3-chloroacetylacetonate or vanadyl α-formyl cyclohexanonate.

5. Process according to claim 1 in which the olefinic monomer is vinyl chloride and the temperature of polymerization is 10° to 20°C.

* * * * *

UNITED STATES PATENT OFFICE
CERTIFICATE OF CORRECTION

Patent No. 3,860,568          Dated January 14, 1975

Inventor(s) CHABERT ET AL.

It is certified that error appears in the above-identified patent and that said Letters Patent are hereby corrected as shown below:

IN THE HEADING:

Please delete the statement of the inventors in its entirety and substitute therefor the following statement of the inventors and their residencies.

--Inventors: Henri Chabert, Lyon; Robert Aime Chapurlat, Lyon; Claude Gigou, Vernaison (Rhone); Michel Ruaud, Villeneuve Par Ternay (Isere), all of France--

Signed and sealed this 15th day of April 1975.

(SEAL)
Attest:

RUTH C. MASON
Attesting Officer

C. MARSHALL DANN
Commissioner of Patents
and Trademarks